Aug. 8, 1972   A. H. WILLINGER   3,682,753
ARTIFICIAL AQUARIUM PLANT SIMULATING A NATURAL PLANT
Filed Jan. 26, 1970   3 Sheets-Sheet 1

INVENTOR.
Allan H. Willinger
BY
Friedman & Goodman
Attorneys

Aug. 8, 1972  A. H. WILLINGER  3,682,753
ARTIFICIAL AQUARIUM PLANT SIMULATING A NATURAL PLANT
Filed Jan. 26, 1970

INVENTOR.
Allan H. Willinger
BY

//  # United States Patent Office 3,682,753
Patented Aug. 8, 1972

3,682,753
ARTIFICIAL AQUARIUM PLANT SIMULATING A NATURAL PLANT
Allan H. Willinger, Maywood, N.J., assignor to Metaframe Corporation, Maywood, N.J.
Filed Jan. 26, 1970, Ser. No. 5,516
Int. Cl. A01n *3/00;* A41g *1/00;* A47g *7/00*
U.S. Cl. 161—18                                   10 Claims

ABSTRACT OF THE DISCLOSURE

An artificial aquarium plant simulating the appearance of natural plants. The artificial plant comprises a bottom receptacle member with a detachable plant member.

BACKGROUND OF THE INVENTION

This invention relates to decorating an aquarium and more particularly to plant decorations for an aquarium.

Simulated plants comprising a material which resembles the natural appearance of plants used in aquariums are widely used today. Generally, these artificial plants comprise a resilient lighter than water type waterproof material, such as a low density polyethylene. Their color generally is as close as possible to the color of the natural plant simulated thereby.

Several problems are attendant such as prior art plants. For example, the anchorage of these plants often is insufficient and frequently, these plants are upended by foraging fish. The plants are also dislodged by water turbulence generated by aeration and filter means used in the aquarium as well as by the hobbyist himself while servicing the aquarium. In addition, due to the problems relating to anchorage as above described related problems also exist. It is for example often difficult to dispose the plants in close proximity to each other. Well known advantages attach to closely positioned plants among them being protection of newly hatched fish and the achievement of esthetic appeal.

An object of the present invention is to provide an artificial plant suitable for use as an aquarium decoration.

Another object of the invention is to provide an artificial aquarium plant exhibiting improved anchorage characteristics.

Still another object of the present invention is to provide an attractive, yet inexpensive artificial aquarium plant.

Another object of the present invention is to provide an artificial aquarium plant which is capable of undulating or swaying in the water to simulate the appearance of natural plant growth.

Other objects, advantages, and features of the present invention will become more apparent from the following description.

SUMMARY OF THE INVENTION

In accordance with the features of the present invention, the above objects are accomplished by providing an artificial aquarium plant comprising a base member and a simulated plant member with the simulated plant member connected to the base member. The base member advantageously comprises a bottom and side wall forming a receptacle to hold sand or other weighting materials therein providing suitable anchorage for the plant.

In the present invention the base member is oval-shaped with arcuate side walls tapered inwardly towards the bottom. The oval shape for the base permits relatively dense positioning of adjacent plants to be accomplished with its attendant advantages. Preferably, the plant comprises a plastic-type material, for instance low density polyethylene having a lower specific gravity than water. The material, in molded form, is resiliently flexible and the plant is thus capable of undulating or swaying in the water enhancing its natural appearance.

As still another feature of the present invention, the simulated plant member is connected to the base member by means of a pin and socket arrangement with the socket being formed in a stem portion of the plant member. The pin is connected with the socket member by means of a press fit, thereby firmly attaching the members together.

BRIEF DESCRIPTION OF THE DRAWING

The invention will be hereinafter more fully described with reference to the accompanying drawings, in which.

DESCRIPTION OF THE SPECIFIC EMBODIMENT

Figure 1:
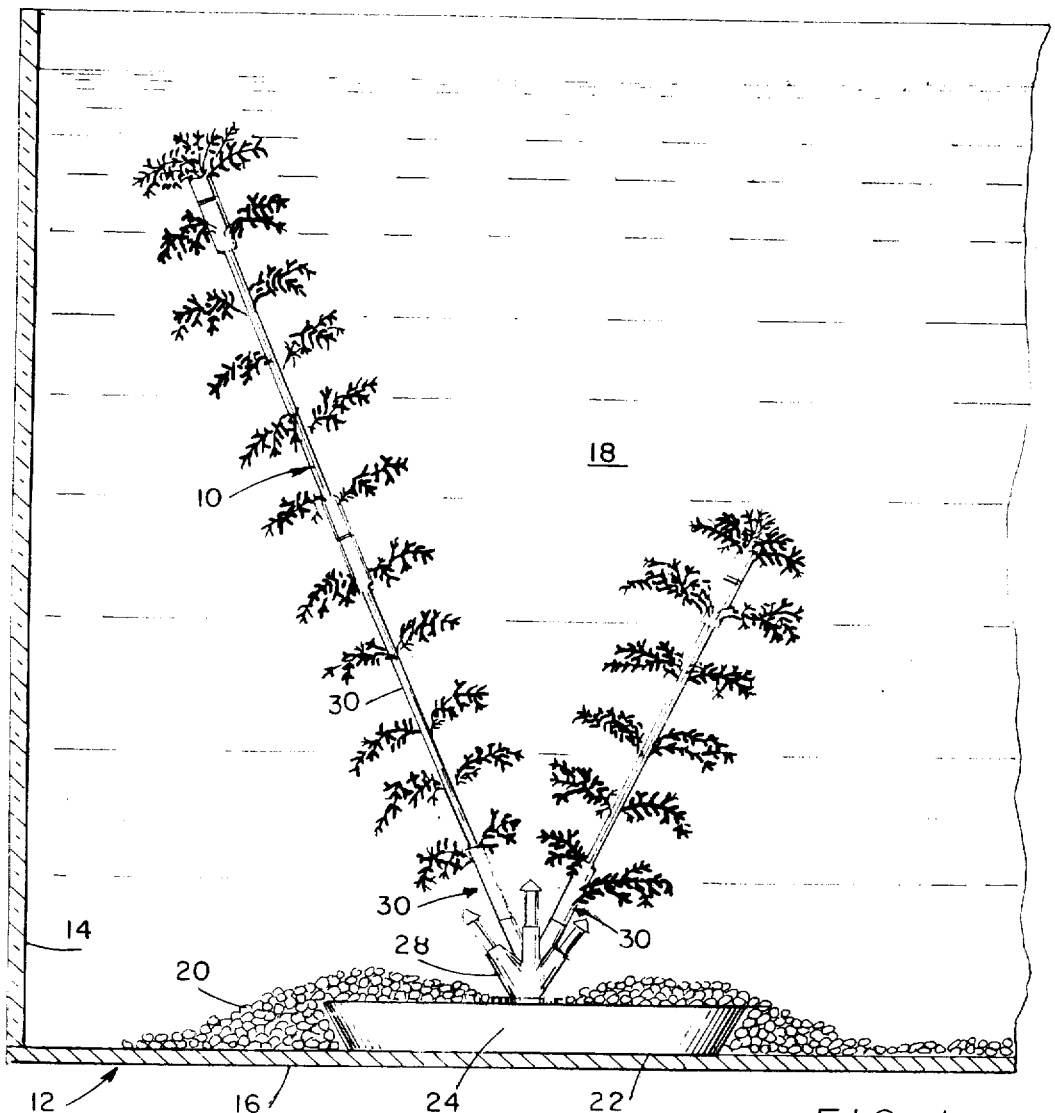
FIG. 1 is an elevated partial sectional side view of an aquarium containing the simulated plant of the present invention.

In the prior art, artificial plants utilized to decorate aquariums suffer from severe instability and anchorage problems. In accordance with a principle of the present invention, an artificial plant comprising base and plant members is provided which substantially minimizes this stability and anchorage problem.

The plant 10 of the present invention is placed in an aquarium 12 having side walls 14 and a bottom member 16. Water 18 is provided for the aquarium to achieve a desired height providing sufficient living space for the plant and animal life contained in the aquarium. Frequently, sand and gravel 20 are utilized at the bottom of the aquarium to enhance its physical appearance as well as providing functional characteristics for the plant and fish life. In accordance with a principle of the present invention, the plant comprises a base member 22 connected to a plant member 10. Base member 22 preferably is oval in shape comprising arcuate wall 24 tapered inwardly towards the bottom 26 of the base member. In this manner, the sand and gravel utilized at the bottom of the aquarium may be held in the base member providing stability and anchorage for the artificial plant of the present invention. Preferably, the plant is fabricated of a flexible and resilient material, for instance, polyethylene.

Figure 2:
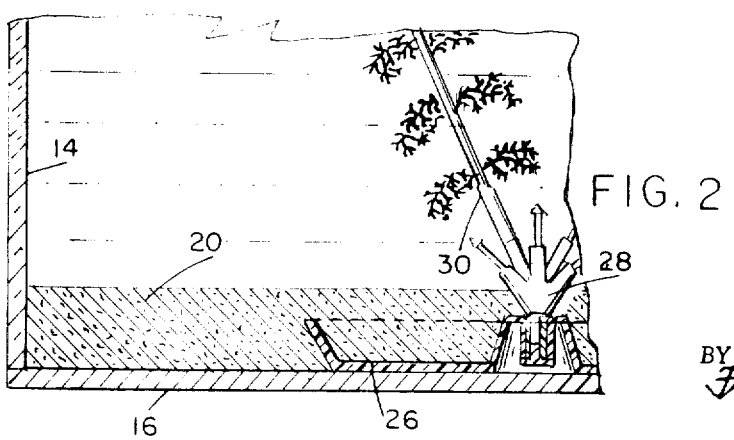
FIG. 2 is an elevated partial sectional side view of the aquarium and artificial plant of the present invention.
Figure 4:
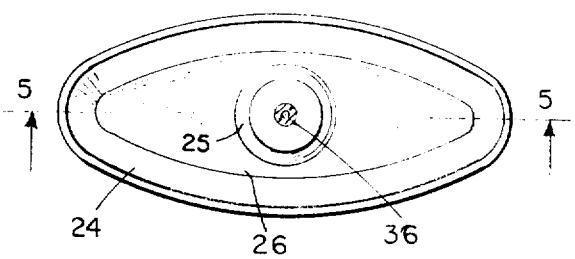
FIG. 4 is a top plan view of the base member of the present invention.
Figure 5:
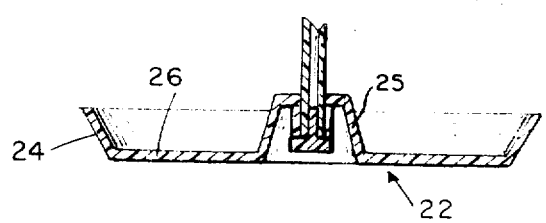
FIG. 5 is a sectional view taken generally along lines 5—5 of FIG. 4.
Figure 6:
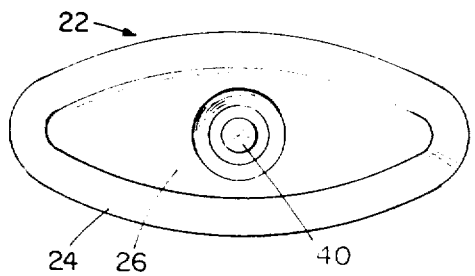
FIG. 6 is a bottom view of the base member of the present invention.
Figure 3:
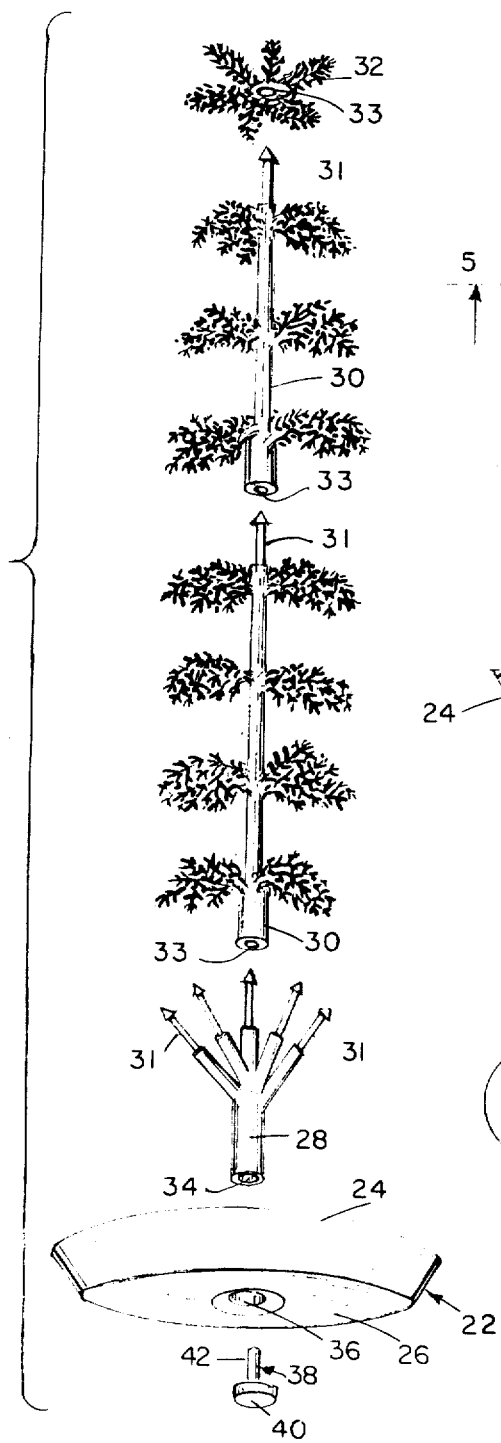
FIG. 3 is an assembly view of the artificial plant.
Figure 7:
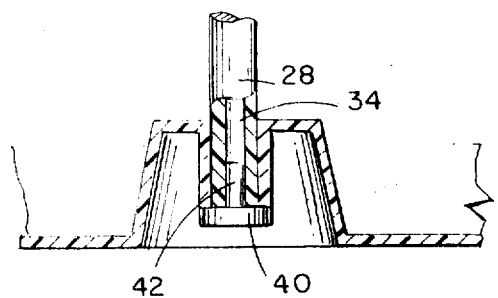
FIG. 7 is an elevated partial side sectional view of the mounting assembly of the present invention.

As shown in FIGS. 2, 5 and 7 of the drawings, a portion 25 of the bottom 26 of the base member 22 extends upwardly from the bottom 26. As best illustrated in FIG. 4, the bottom portion 25 is centrally disposed and spaced from the side walls 24.

In some instances the plant member of the present invention comprises a trunk member 28 and stem members 30 adapted to be connected to the trunk member and to each other. In accordance with a feature of the present invention, the stem portion 30 and branch portions 32 comprise detachable sections readily fitting into each other so that the appearance desired for the plant may be easily achieved by merely connecting the desired sections together by suitable pin 31 and socket 33 assemblies. The trunk, stem and branch portions may of course be molded as an integral unit.

A longitudinally extending cylindrical hollow portion 34 is provided at the bottom of the trunk member 28. An aperture 36 is provided in the bottom portion 25 of the base member 22 adapted to receive the bottom portion of the trunk member 28 therethrough. A fastener or retaining member 38 comprising a head 40 and a shank 42 is adapted to be inserted from the bottom of the base member 24 through the aperture 36 and to be press fitted into the hollow portion 34 of the trunk member. Since the artificial plant comprises a resilient-type material, the press fit achieved between hollow portion 34 and projection 42 provides a secure mounting assembly for the plant member of the present invention. The outer walls of the trunk member 28 will press against the inner walls of aperture 36 thus securely fastening the plant member to the base member of the present invention.

Figure 8:
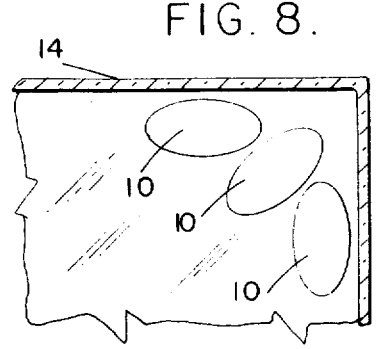
FIGS. 8 through 11 are partial top plan views of an aquarium illustrating various arrangements for placing a plurality of plants in the aquarium to achieve a dense plant arrangement.
Figure 9:
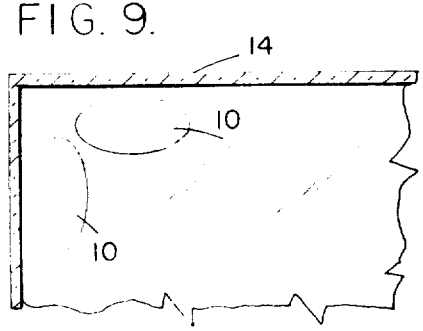
Figure 10:
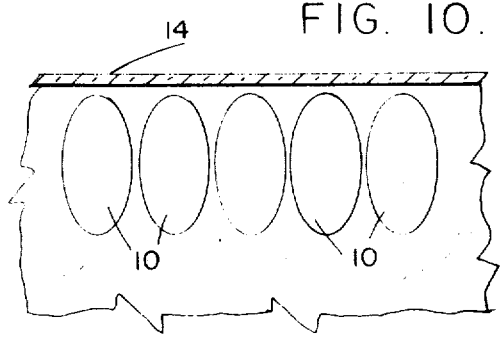
Figure 11:
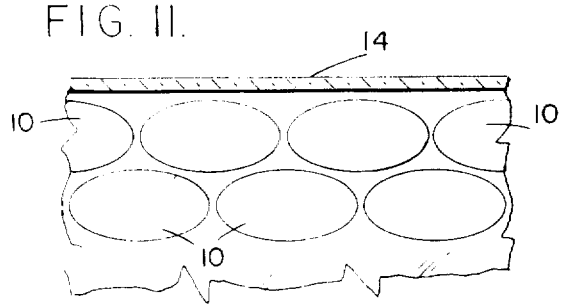

FIGS. 8 through 11 illustrate various arrangements for placing the plant members at the bottom of an aquarium to achieve dense packing for the artificial plants. As may be clearly seen by referring to these figures, the oval configuration provided in accordance with a feature of the present invention efficiently enables a high density positioning of plant units to be achieved. The plants may be placed perpendicular to one another as shown in FIG. 9 or adjacent to one another in a parallel or staggered fashion as shown in FIGS. 10 and 11, or in close proximity to one another at predetermined angles as shown in FIG. 8. In any case, it is believed that the desired high density may be easily achieved utilizing the oval base of the present invention.

While polyethylene has been described for use with the present invention, other suitable resilient and flexible materials may be utilized. The shape of the base member, shown in the preferred embodiment is oval, it may however be of other shapes to accomplish some of the features of the present invention wherein the receptacle properties of the base member are retained. Further, the specific gravity of the material utilized in the construction of the present aquarium plant is less than that of water enabling the artificial plant to give the appearance of undulating or swaying enhancing its attractiveness and natural appearance.

The above preferred embodiment illustrates the principle of the present invention and therefore should not be construed in a limiting sense. To that end, therefore, this invention should be accorded the full scope of protection available in accordance with this patent application.

What is claimed is:

1. An artificial aquarium plant simulating a natural plant comprising a base member and a plant member, said base member including side walls and a bottom, said plant member being disposed above said bottom, said side walls being joined to said bottom with said side walls extending upwardly from said bottom to define receptacle means open towards said plant member for receiving materials to provide anchorage for said plant member, said plant member being provided with a trunk including a longitudinally extending hollow portion open at an end thereof, said base member being provided with an aperture for receiving said trunk, and a retaining member insertable in said hollow portion to define means for connecting said plant member to said base member.

2. An artificial aquarium plant as set forth in claim 1, wherein said base member is oval in shape.

3. An artificial aquarium plant as set forth in claim 2, wherein said side walls are arcuate and tapered inwardly towards said bottom.

4. An artificial aquarium plant as set forth in claim 1, wherein said plant member includes portions comprising detachable sections.

5. An artificial aquarium plant as set forth in claim 1, wherein said longitudinally extending hollow portion is cylindrical in shape and said retaining member comprises head and shank portions, said shank portion being adapted to be press fit into said cylindrical longitudinally extending hollow portion causing it to press against the walls of said aperture.

6. An artificial aquarium plant simulating a natural plant comprising a base member, a plant member, said base member including side walls and a bottom, said side walls being joined to said bottom with said side walls extending upwardly from said bottom to define a receptacle open towards said plant member, a portion of said bottom extending upwardly, said bottom portion being provided with aperture means to receive a trunk portion of said plant member therein for connecting said plant member to said base member, said trunk portion being provided with an opening accessible from underneath said bottom portion when said trunk portion is inserted in said aperture means, a retaining member including a head and a shank, said head being larger than said aperture means, said retaining member head being disposed underneath said bottom portion with said shank being press fitted into said trunk portion opening causing said trunk portion to be pressed against walls of said aperture means to connect said plant member to said base member.

7. An artificial aquarium plant as set forth in claim 6, wherein said base member is oval in shape.

8. An artificial aquarium plant as set forth in claim 7, wherein said side walls are arcuate and tapered inwardly towards said bottom.

9. An artificial aquarium plant as set forth in claim 6, wherein said bottom portion is centrally disposed and spaced from said side walls.

10. An artificial aquarium plant as set forth in claim 6, wherein said trunk portion is cylindrical in shape.

References Cited

UNITED STATES PATENTS

| 3,374,575 | 3/1968 | Tong | 248—27.8 X |
|---|---|---|---|
| 3,401,074 | 9/1968 | Takenouchi | 248—27.8 X |
| 1,555,475 | 9/1925 | Maunz | 248—27.8 X |
| 2,826,846 | 3/1958 | Warren | 161—24 |
| 2,601,658 | 6/1952 | Bussert | 161—18 X |
| 3,234,073 | 2/1966 | Raymond et al. | 161—24 |

FOREIGN PATENTS

| 969,717 | 9/1964 | Great Britain | 161—22 |

PHILIP DIER, Primary Examiner

U.S. Cl. X.R.

161—24, 27; 248—27.8